United States Patent
Jain et al.

(10) Patent No.: US 12,412,189 B2
(45) Date of Patent: Sep. 9, 2025

(54) PREDICTIVELY AND DYNAMICALLY UPDATING CONTENT USING NESTED A/B TESTING

(71) Applicant: Adobe Inc., San Jose, CA (US)

(72) Inventors: Ajay Jain, San Jose, CA (US); Eric Kienle, Portland, OR (US)

(73) Assignee: Adobe Inc., San Jose, CA (US)

(*) Notice: Subject to any disclaimer, the term of this patent is extended or adjusted under 35 U.S.C. 154(b) by 14 days.

(21) Appl. No.: 18/213,651

(22) Filed: Jun. 23, 2023

(65) Prior Publication Data

US 2024/0428291 A1    Dec. 26, 2024

(51) Int. Cl.
G06Q 30/00       (2023.01)
G06Q 30/0251     (2023.01)

(52) U.S. Cl.
CPC ................. G06Q 30/0251 (2013.01)

(58) Field of Classification Search
None
See application file for complete search history.

(56) References Cited

U.S. PATENT DOCUMENTS

| | | | |
|---|---|---|---|
| 2015/0025959 A1* | 1/2015 | Raghuveer | G06Q 30/0245 705/14.44 |
| 2015/0227983 A1* | 8/2015 | Eustace | G06F 16/8373 705/7.33 |
| 2016/0117740 A1* | 4/2016 | Linden | G06Q 50/01 705/14.66 |
| 2017/0178179 A1* | 6/2017 | Bauman | G06Q 30/0244 |
| 2017/0323331 A1* | 11/2017 | Malek | G06Q 30/0246 |
| 2019/0087852 A1* | 3/2019 | Blom | G06Q 30/0269 |
| 2019/0236621 A1* | 8/2019 | Liu | G06Q 10/107 |

(Continued)

FOREIGN PATENT DOCUMENTS

WO    WO-2016130803 A1 *    8/2016    ......... G06F 16/8373

OTHER PUBLICATIONS

Singh, Nripendra, et al. "A/B Testing and Audience Creation for Effective Digital Marketing: Evidences from Facebook Analytics." 2023 6th International Conference on Information Systems and Computer Networks (ISCON). IEEE, 2023. (Year: 2023).*

(Continued)

*Primary Examiner* — Michael Bekerman
(74) *Attorney, Agent, or Firm* — Kilpatrick Townsend & Stockton LLP

(57) ABSTRACT

Systems and methods for predictively and dynamically updating content using nested A/B testing are provided. In certain embodiments, a system may assign a content item to a dynamic content portion of a communication. The communication may be sent to a first plurality of recipients. The system may receive information about interactions of a second plurality of recipients with the communication, wherein the second plurality of recipients is a subset of the first plurality of recipients. The system can determine a first conversion metric. The system can then compare the first conversion metric to a conversion metric threshold and based on the comparison, modify the dynamic content portion of the communication to generate a modified communication. The modified communication may be sent to a third plurality of recipients, wherein the third plurality of recipients is a subset of the first plurality of recipients not including the second plurality of recipients.

18 Claims, 6 Drawing Sheets

(56) References Cited

U.S. PATENT DOCUMENTS

2020/0272791 A1* 8/2020 Jonnalagadda .......... G06N 5/04
2021/0142357 A1* 5/2021 Truong .............. G06Q 30/0244
2021/0390578 A1* 12/2021 Calabrese .......... G06Q 30/0246

OTHER PUBLICATIONS

Kumar, Saurabh. "The Role of A/B Testing in Advancing Marketing Analytics: A Systematic Approach." Journal of Scientific and Engineering Research 8.12 (2021): 323-330. (Year: 2021).*

Content Marketing Institute, B2B Content Marketing, "2016 Benchmarks, Budget, and Trends—North America" Available online at https://contentmarketinginstitute.com/, 2016, pp. 1-32.

Zoominfo, "It's Our Business to Grow Yours", available online at https://www.zoominfo.com/, 2023, 10 pages.

Adobe Experience Cloud, "Email Marketing", Available at https://business.adobe.com/products/marketo/email-marketing.html, 2023, 9 pages.

Adobe Experience Cloud, "Predictive Content", Available at https://business.adobe.com/products/marketo/predictive-content.html, 2023, 8 pages.

Adobe Experience Cloud Blog, "Lead Management—Definition Process, and Best Practices", available online at https://business.adobe.com/blog/basics/lead-management, Apr. 26, 2023, 11 pages.

Adobe Experience Cloud, Adobe Marketo Engage, "Leave No Lead Behind With Advance Lead Management", available online at https://business.adobe.com/products/marketo/lead-management.html, 2023 11 pages.

* cited by examiner

PREDICTIVELY AND DYNAMICALLY UPDATING CONTENT USING NESTED A/B TESTING

TECHNICAL FIELD

This disclosure generally relates to marketing and, more specifically, to predictively and dynamically updating content using nested A/B testing.

BACKGROUND

Modern marketing digital campaigns typically involve conveying targeted content to user segments based on user data gathered from several available sources. Such campaigns can be carried out using software for identifying user segments based on, for example, certain demographic criteria. Then, digital content can be mapped to the identified user segments. For example, a user segment consisting of likely golfers can be sent an email containing a link to a marketing video featuring golf clubs.

In some cases, it may be desirable to send multiple items of related marketing content to a particular user segment. For example, multiple versions of a marketing video featuring golf clubs may be produced. In such cases, one traditional marketing strategy consists of sending one content item to a portion of the user segment and a different but related content item to a different portion of the user segment. This strategy is sometimes referred to as A/B testing. It may be possible to determine which content item resulted in a higher success rate according to a specified criterion at the conclusion of the marketing campaign.

SUMMARY

Some embodiments described herein relate to systems and methods for predictively and dynamically updating content using nested A/B testing. In an example method, a computing device assigns a first content item to a dynamic content portion of a communication and sends a copy of the communication to a first group of recipients. The first group of recipients can be based on one or more details about each of the recipients.

The computing device receives information about interactions of a second group of recipients with the copy of the communication, in which the second group of recipients is a subset of the first group of recipients. The computing device then determines, based on the interactions of the second group of recipients, a first conversion metric, in which the first conversion metric indicates a portion of the second group of recipients that have performed one or more conversion interactions. The computing device compares the first conversion metric to a conversion metric threshold and based on the results of the comparison, modifies the dynamic content portion of the communication, to generate a first modified communication. Modification of the dynamic content portion of the communication may include at least one of several possible operations including replacing the first content item with a second content item, assigning the second content item to the dynamic content portion of the communication, modifying the first content item, or removing the first content item.

The computing device then sends a copy of the first modified communication to a third group of recipients, in which the third group of recipients is a subset of the first group of recipients not including the second group of recipients that has not yet interacted with the copy of the communication. The third group of recipients may be determined based on one or more details about each of the recipients of the second group of recipients and the interactions of the second group of recipients with the copy of the communication.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
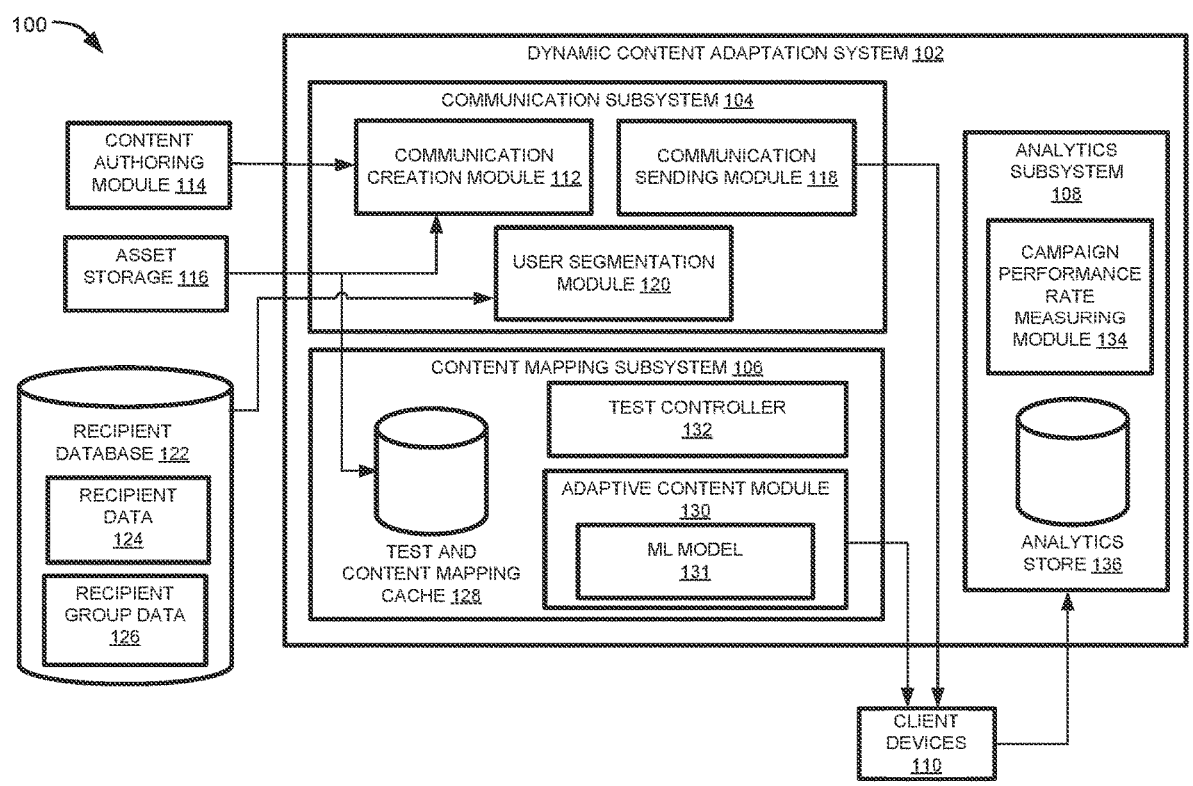
FIG. 1 is a diagram of an example system including a dynamic content adaptation system for predictively and dynamically updating content using nested A/B testing, according to some embodiments of the present disclosure.

Creators of marketing materials carefully craft digital content with the goal of maximizing conversion rates. The conversion rate, or the fraction of content recipients that ultimately take a desired action, may be closely correlated with the precision with which content can be targeted at a given recipient or group of recipients, or leads. Lead generation, tracking, and nurturing are thus critical for developing the information needed for identifying target user segments for marketing campaigns and may be related to core functions of marketing software solutions designed to boost conversion rates.

In order to maximize conversion rates, digital marketers may, for example, drive results using personalized email campaigns. Software tools may be used to identify user segments based on, for example, certain demographic criteria using near real-time information from various available sources. Then, digital content can be mapped to the user segments identified using the most current available information. For example, a user segment consisting of users who are currently viewing a streaming golf tournament can be shown web-based marketing content featuring golf clubs.

In some cases, digital marketers may prepare several content items for a particular user segment. For instance, for a user segment consisting of users who are currently viewing a streaming golf tournament, a digital marketer may prepare multiple versions of web-based marketing content related to golf clubs or multiple videos featuring variations of golf-related clothing. In such cases, one traditional marketing strategy, referred to as A/B testing, consists of directing one content item to a portion of the user segment and a different but related content item to a different portion of the user segment. Analytics tools can be used to determine which content item resulted in a higher success rate according to specified criteria at the conclusion of the marketing campaign. This information can be used to create follow-on campaigns with a higher likelihood of success.

One limitation of this approach is that evaluation of the marketing campaign is conducted at the conclusion of the campaign. Thus, while A/B testing may reveal which content items were most successful during a campaign, the campaign nevertheless runs to completion, even if information about the relative appeal of the content items presented is available earlier, as the campaign progressed. Potential conversions may have been lost. Thus, a need exists to adjust marketing campaigns dynamically based on results of A/B testing during the marketing campaigns so that information regarding the relative appeal or success of content items are acted upon as soon as sufficient data is available to make a determination of which content items are yielding the best results.

Another limitation consists in the limited scope of marketing content decisions based on A/B testing. For example, if a digital marketer executes a marketing campaign using A/B testing and concludes that a particular content item drives the highest success rate, in some cases, a follow-on campaign may use that information. But further optimization of conversion rates may yet be possible. Potential conversions may be lost when decisions about follow-on marketing campaigns are made on the basis of a single A/B test. Therefore, a need exists to further apply the methods of A/B testing during a marketing campaign and not necessarily wait until the conclusion of a marketing campaign to carry out additional optimizations.

These limitations can be addressed using techniques for predictively and dynamically updating content using nested A/B testing. In some examples, the techniques disclosed herein can dynamically adapt content items targeted for certain users based on the actions of users from the same user segment who have already interacted with certain content. Likewise, some examples may include the capability to dynamically reapportion user segments during a marketing campaign and to assign new content items to the reapportioned user segments based on the actions of users from the same user segment who have already interacted with certain content.

In an example implementation, a computing device performs a method for predictively and dynamically updating content using nested A/B testing. The computing device may include a dynamic content adaptation system, including components for preparation of communications, mapping of content, and for tracking the performance of ongoing campaigns. After generating a communication, the computing device assigns a first content item to a dynamic content portion of a communication. The communication may be an email, video, web page, newsletter, forum post, podcast, social media post, e-book, embedded content, audio, or other suitable media for the conveyance of marketing information. The communication thus includes a dynamic content portion which is a portion of the communication that includes content that can be varied by the computing device in a way that is transparent to the communication recipient. For example, the communication may include an image that is loaded from a particular uniform resource locator ("URL").

The computing device may vary the image that is returned from the particular URL, while the particular URL remains constant from the perspective of the recipient. Communications may include multiple dynamic content portions, and dynamic content portions may have a many-to-many relationship with mapped content.

The computing device sends a copy of the communication to a first plurality of recipients. In some examples, the first plurality of recipients may be selected from a recipient database using one or more criteria relating to the desired demographics or other characteristics of the first plurality. For example, the computing device can query the recipient database using the desired demographics to limit the data retrieved and to specify with the desired precision the members of the first plurality. A communication subsystem may be used to send the communication to the first plurality of recipients. For instance, if the communication is an email, the communication subsystem transmits a copy of the email to the email addresses of the first plurality. In another example, if the communication is marketing content on a webpage, the communication subsystem updates mappings that associate the web content displayed for particular users using, for example, cookies or logged-in status, such that a particular copy of the communication is displayed for each user.

The computing device receives information about interactions of a second plurality of recipients with the copy of the communication, wherein the second plurality of recipients is a subset of the first plurality of recipients. Interaction with the communication may vary depending on the format of the communication. For instance, for an email communication, interactions may include opening the email, scrolling through the email, clicking on links included in the email, and so forth. For a communication that is marketing content on a webpage, interactions may include viewing the content (e.g., the content is loaded from a web server), clicking on the content, mousing over the content, and so on. The communications may include suitable program code for relaying information about the interactions to the computing device. For example, for marketing content on a webpage, the webpage may include JavaScript that can track user interactions and send information about the interactions to the computing device.

The computing device determines, based on the interactions of the second plurality of recipients, a first conversion metric, wherein the first conversion metric indicates the portion of the second plurality of recipients that have performed one or more conversion interactions. Conversion interactions are those interactions that the digital marketer associates with a successful conversion. For instance, a successful conversion for an email communication may be signified by opening the email communication and scrolling to the end of it. Likewise, a successful conversion for a web-based communication may include clicking on the content item. The computing device can receive the information about the interactions and convert the information into a conversion metric according to one or more algorithms. For example, the number of successful conversions may be counted and divided by the total number of communications encountered by any member of the second plurality of recipients to determine a success rate.

The computing device compares the first conversion metric to a conversion metric threshold. For example, the digital marketer may set a conversion rate goal for a particular marketing campaign of 10%. The computing device, using the conversion metric determined previously, can compare the determined metric to the marketing campaign goal. Other threshold values, units, and types of comparisons may be used. For instance, some conversion metrics may have units involving certain actions per unit time. The conversion metric threshold may be set according to the needs of the digital marketer or other operator of the computing device. Alternatively, the comparison may be used to detect a marketing campaign that is not succeeding.

The computing device then, based on the comparison, modifies the dynamic content portion of the communication, to generate a first modified communication. The modifications may be generated using predictive content software. The predictive content software may use machine learning algorithms to analyze user behavioral data, such as browsing history, purchase history, or interaction with previous marketing emails, and forecasts user preferences and potential future actions. The dynamic content portion of the communication can be modified in accordance with these predictions.

For example, the dynamic content portion for an email may include an inline image that is loaded from a particular URL. The computing device may, based on the comparison, replace the image loaded from the URL with a different image identified by the predictive content software. In another example, the dynamic content portion for a webpage may include a text string that is rendered by a web server before being seen by the recipient. The computing device may, based on the comparison, render the webpage using alternative text generated by the predictive content software. Modifications to the communication may include, among other operations, replacing the content, re-assigning content to the dynamic content portion of the communication, modifying content, or removing content.

The computing device sends a copy of the first modified communication to a third plurality of recipients, wherein the third plurality of recipients is a subset of the first plurality of recipients not including the second plurality of recipients. Here, the portion of the first plurality of recipients that has not yet received or interacted with the communication is targeted for a nested A/B test. The word "nested" refers to applicability of the nested A/B test to only a portion of the first plurality of recipients. The nested A/B test involves determining, from the subset that has not yet received the communication (the portion of the first plurality of recipients that has not yet received the communication), two subsets; and A group and a B group.

In this example, the A group is the third plurality of recipients. The third plurality is some portion of the first plurality that has not yet received and/or interacted with the communication. This third plurality of recipients (the A group) receives the first modified communication containing the new or alternative content items in the dynamic content portion of the modified communication. The remaining portion of the first plurality of recipients that has not yet received the communication (the B group) receives the copy of the communication originally sent to the first plurality.

After a period of time (either fixed or variable) has elapsed, the determination of a conversion metric based on the receipt of and interactions with the first modified communication are performed for the nested A and B groups, similar to the determination described above for the first plurality, to determine whether the copy of the communication originally sent to the first plurality or the first modified communication results in a more or less successful conversion rate. Based on those results, the nested A/B technique can be reperformed with another subset of the more successful of the two groups, and so on, with deeper nesting, until the campaign is complete.

One of ordinary skill in the art will recognize that the techniques of the present disclosure are not limited to A/B testing. For instance, A/B/n testing or multivariate testing refers to an extension of the A/B testing concept to more than two choices. For instance, several different versions of a related content item can be sent to distinct portions of a user segment to determine the best-performing version. Moreover, the techniques may be equally used with other user experience research methodologies. For example, the techniques may be applied with some adaptation to manual usability testing, heatmaps and clickmaps, surveys and feedback, or user analytics, among other methodologies.

The systems and methods disclosed herein for predictively and dynamically updating content using nested A/B testing constitute improvements to the technical field of digital marketing. Significant effort and expenditure may go into execution of digital marketing campaign. Prior to the innovations of the present disclosure, feedback on the effectiveness of the campaign may only be available at the conclusion of the campaign. Campaigns involving A/B testing were sequential, each test using the results of the previous test to improve effectiveness. But because sufficient data may be available prior to the conclusion of the campaign to determine the effectiveness of the campaign, conversions are potentially lost by allowing the campaign to conclude. The techniques of the present disclosure can be used to implement automatic, dynamic changes to the marketing campaign as soon as the effectiveness is known with sufficient resolution. Acting earlier, automatically, and dynamically can increase conversions and revenue, with reduced effort for marketers, since fewer test campaigns are needed. Moreover, the techniques of the present disclosure, when used in concert with marketing content precisely targeted to demographic subgroups, may achieve significantly greater efficiency in the use of available marketing resources.

The techniques of the present disclosure extend the boundaries of digital marketing capabilities, as the techniques may be applied to any type of digital marketing campaign (e.g., web, video, email, etc.) and for various types of marketing strategies (e.g., A/B testing, multivariate testing, user testing, personalization, retargeting, conversion rate optimization, etc.) involving subsets of targeted user segments. Thus, the techniques may optimize marketing strategies to target and convert potential customers at the beginning of their engagement with the marketed content (the "top of the funnel") with improved processes for tracking and analyzing the factors that contribute to lead generation and identifying the areas where potential customers show the most interest or engagement. Thus, the techniques naturally result in better optimized marketing strategies and tactics to attract more qualified leads, who are more likely to convert into customers.

FIG. 1 is a diagram of an example system 100 including dynamic content adaptation system 102 for predictively and dynamically updating content using nested A/B testing. System 100 illustrates a possible example implementation, but other implementations or embodiments are also possible. For instance, some embodiments may include variations on the functional groupings described below or be configured with some components on remote servers or cloud providers. In general, the communication subsystem 104 prepares marketing content for use in digital marketing campaigns. A marketing campaign includes one or more communications. A communication that is part of a marketing campaign includes one or more content items, some of which may be mapped to a dynamic content portion. The communication subsystem 104 additionally associates communications, including dynamic content portions contained therein, with recipients who are members of user segments. The association is used by content mapping subsystem 106 to direct dynamic content to the dynamic content portions of the communications using the techniques of the present disclosure. The analytics subsystem 108 is used by the content mapping subsystem 106 to measure the performance of ongoing campaigns for use in controlling campaign and test execution. Each of these components will be discussed in detail below.

Development of a marketing campaign begins with the generation of content items using content authoring module 114. Content authoring module 114 may include tools for the authoring of content items including content management systems (CMS), email marketing software, social media management tools, search engine optimization (SEO) tools, keyword research tools, analytics and reporting tools, marketing automation software, graphic design software, video editing software, project management tools, collaboration tools, copywriting and editing software, content ideation and planning tools, and so on.

The content authoring module 114 may be used for the creation of any number of content items in preparation for a marketing campaign. As used herein a "content item" refers to any type of digital content, such as an image, video, animation, blog post, article, or social media post, that is created and shared with the goal of promoting a product, service, or brand. Content items are included in communications like emails, videos, web pages, newsletters, forum posts, podcasts, social media posts, e-books, and so on. In some cases, a communication may consist of a single content item. For example, a simple web page may include only a single content item, like an image. Content items may also be reused and shared among campaigns.

In anticipation of using nested A/B testing as described herein, a marketer may create several versions of a given marketing content item. For example, for a marketing campaign targeting golfers, the marketer may prepare several versions of a video, each taking a different approach to appealing to a target demographic. Images for web-based ads may be varied using different word choices, fonts, styles, offers, and so on. Email campaigns may choose different language, lengths, approaches, inline art, and so on.

Content authoring module 114 may use content from asset storage 116. Asset storage 116 includes local-, network-, and cloud-based storage of the videos, images, palettes, fonts, icons, and other assets that may be used in content items. Asset storage 116 includes content items that may be assigned to dynamic content portions. In some examples, asset storage 116 includes content loaded from the internet. For example, videos for marketing may be produced using a third-party video production service. Asset storage 116 can include, for example, links to streaming videos provided by the third-party production service.

Content generated using content authoring module 114 is received by communication creation module 112 for the production of marketing communications. A marketing communication may be an email, forum post, video, web page, among other possible forms that modern digital marketing can take. Communication creation module 112 prepares the communication for assignment to a particular recipient or group of recipients by integrating the content items into a communication. As used herein, "communication" refers to a collection of marketing content designated for consumption by a particular recipient that may include one or more dynamic content portions. Examples of communications include email, video, web page, newsletter, forum post, podcast, social media post, e-book, embedded content, audio, or other suitable media for the conveyance of marketing information. For instance, content items may be placed into standard corporate email templates and uploaded to a mass email service provided by communication sending module 118. In another example, content items may be added to a business webpage and then prepared for release by a marketing or CMS software platform provided by communication sending module 118. For example, Adobe Marketo® is an example of a marketing software platform that can receive communications and prepare them for distribution to user segments.

Marketing communications created using communication creation module 112 may include portions of the communications designated as dynamic content portions. A dynamic content portion is one that has a content item mapped or assigned to it, in which the content item can also be remapped or reassigned while the marketing campaign is ongoing. For example, an email may contain an image that is mapped to a dynamic content portion. The image may be loaded from a URL that remains static, while the particular image that is loaded from that URL can be reassigned. Dynamic content portions can be text, images, videos, animations, surveys, polls, games, or any other suitable marketing content that can be dynamically reassigned.

Communication sending module 118 includes one or more components for sending communications to target recipients. The target recipients access the communications using components of one or more client devices 110. Client devices 110 may contain various programs for reviewing marketing communications including web browsers, email readers, video viewers, and so forth. For example, for an email marketing communication, communication sending module 118 may include an email server (e.g., a Simple Mail Transfer Protocol ("SMTP") server). For a web-based marketing communication, the communication sending module 118 may provide a web server or suitable tools for pushing web-based content to a remote web server. For instance, content may be pushed using the File Transfer Protocol ("FTP"), Secure Copy ("SCP"), network drives, or using tools providing by cloud-based web hosts, among other mechanisms. For video-based marketing content, the communication sending module 118 may include a component for uploading video content to a video-hosting side. For instance, the component may use the video hosting site application programming interface ("API") to upload video content.

User segmentation module 120 determines the individual recipients or groups of recipients of communications generated by communication creation module 112 by generating user segments, and subsets thereof. The targets of a marketing campaign are first identified by selecting a set of lookalike audiences for the campaign. A "lookalike audience," as used herein, refers to a group of potential recipients who exhibit similarities to another group of potential recipients, based on certain characteristics.

For the identification of the lookalike audience, recipient database 122 is used. Recipient database 122 may be a component of system 102 or may reside on a network- or cloud-storage system. For example, the recipient database 122 may be a hosted database provided by a cloud storage provider. The recipient database 122 may also be hosted by a third-party and provide data as a service to digital marketers. User segmentation module 120 can issue queries to recipient database 122 based on the desired demographic characteristics of the target lookalike audience. For example, for a marketer preparing a campaign for golfing enthusiasts, the marketer may issue queries that relate to golfing, golf clothing, recent user actions relating to golfing (e.g., streaming a golf tournament or visiting a golf-related websites), friends with other users who golf, and so on. Queries are processed by recipient database 122 and results are returned from recipient data 124.

In certain embodiments, the recipient database 122 is a relational database that is queried using the structured query language ("SQL"). For example, the recipient data 124 may be a table or collection of tables containing user data and related demographic data. The recipient database 122 receives SQL queries including limiting clauses (e.g., WHERE clauses) that express the desired demographics of the lookalike audience. Other kinds of databases may also contain the recipient data 124 including, for example, document-oriented databases, graph databases, key-value stores, column-family stores, time-series databases, object-oriented databases, and in-memory databases, among other possibilities.

In some embodiments, user segments created through demographic queries may be saved for repeated campaigns. The queries or resultant groups of recipients can be persisted in the recipient database 122 at recipient group data 126. For example, recipient group data 126 may be a table or collection of tables containing information about previous queries, recipients, campaigns derived from those queries, the content used, the results of those campaigns, and so on.

In certain embodiments, marketing automation software may be used to generate user segments using available recipient data 124 that includes predictive content capabilities. The predictive content capabilities may employ machine learning ("ML") algorithms to analyze recipient data 124 and predict the most effective content for each individual recipient.

Content mapping subsystem 106 directs content items to the dynamic content portions of the communications. Test controller 132 coordinates the activities of the communication 104, content mapping 106, and analytics subsystems 108 in the context of a nested A/B test or other compatible approach for dynamically conducting marketing campaigns. Test controller 132 may receive references to the various content (e.g., multiple versions of a video) for mapping to dynamic content portions of the communications created using the communication subsystem. Test controller 132 also may receive information about the initiation of a marketing campaign including, for example, timestamps upon initiation, information about user segments and recipients, and test parameters. Test controller 132 also may receive information about interactions with the sent communications, on a per-recipient basis, and information about performance of the marketing campaign in real-time or near-real-time.

The status of in-progress marketing campaigns may be ephemerally stored in a memory device like an in-memory or persistent cache or database. For instance, as a marketing campaign transitions from one phase to another, the test and content mapping cache 128 may be updated to with information reflection the current phase or status of the campaign. For example, a marketing campaign may be initiated with a single target user segment and then later, after a period of time, transition to a first nested A/B test involving first and second user segments. Upon this transition, the status of the marketing campaign and information about the currently targeted user segments may be updated in the test and content mapping cache 128.

Adaptive content module 130 receives user segments and communications from the communication subsystem 104. Upon receiving an appropriate indication from test controller 132, the adaptive content module 130 identifies dynamic content portions included in the communications and causes dynamic content to be assigned or mapped to the dynamic content portions according to the user segment membership of each recipient. For example, the adaptive content module 130 may receive, from test controller 132, the members of a first user segment and a second user segment, which are the A and B groups of a nested A/B test, respectively. The adaptive content module 130 may receive, from the test controller 132, a first content item directed to the A (the first user segment) and a second content item directed to the B group (the second user segment). The adaptive content module 130 performs the mapping of the first content item onto the dynamic content portions of the communications directed to the A group and the mapping of the second content item onto the dynamic content portions of the communications directed to the B group.

For instance, for a web-based campaign, the adaptive content module 130 may update the image loaded for a URL associated with the recipients of group A (the first user segment) and group B (the second user segment). Note that because the membership of each group cannot be known ahead of time, each recipient must have a unique URL or other dynamically updatable datum or reference that can be re-mapped while utilizing some of the techniques for predictively and dynamically updating content using nested A/B testing.

In some examples, the test and content mapping cache 128 maintains the association between recipients, content, and dynamic content identifiers in addition to information about pending, currently executing, or past marketing campaigns. The test and content mapping cache 128 may be an in-memory ephemeral storage cache or a database used for short-term storage. In one example implementation, an in-memory ephemeral key-value storage cache may be used to store the currently mapped content item and the identifier for that currently mapped content item for a particular designated recipient using a key that identifies the recipient. Consider a target recipient for an email marketing communication identified with email "example@example.com." The email may contain a dynamic content portion that loads an image. The dynamic content portion may be unique for that recipient and have a particular piece of content mapped to it during the campaign. Thus, test and content mapping cache 128 may be updated with a key like "example@example.com:URL" and corresponding value "http://my.biz/dynamic_load/abc123". The test and content mapping cache 128 may be further updated with key "http://my.biz/dynamic_load/abc123" and value "http://asset.storage.example.com/image1.jpg". In this example implementation, test and content mapping cache 128 stores an association between the recipient and the unique static URL, and between the unique static URL and the currently assigned content item. During nested A/B testing, the currently mapped/assigned content item can be updated by updating the value associated with the key "http://my.biz/dynamic_load/abc123".

One of ordinary skill in the art will recognized that the URL mapping scheme described herein is merely one way to dynamically map content and is primarily illustrative. Other approaches may include storing the associations in a database or filesystem, alternative key/value schemes, use of only partially-unique URLs (e.g., assigning a unique URL to a group of recipients, rather than a single, unique recipient), assigning a unique URL to every content item, or using redirecting URLs that redirect based on tracking tags or parameters, among other approaches.

In some examples, dynamically mapped content and/or user segments may be mapped according to the specifications in the particular marketing campaign. Adaptive content module 130 may also include artificial intelligence (AI) or machine learning (ML) model 131 for selection of dynamically mapped content or user segment subsets. Adaptive content module 130 may receive inputs including user online behavior and interaction data, demographic data, geographic information, device information, and past engagement with marketing materials to identify patterns and predict future interests. ML model 131 can be trained to identify or generate personalized content items to be used in communications, for an objective function configured to optimize user engagement and conversion rates by presenting the most relevant content items, offers, or recommendations to each individual user or group of users. In some examples, these models may utilize online training (i.e., train continuously) to learn and adapt to real-time market dynamics.

The ML model 131 may be trained using supervised or semi-supervised learning techniques including labeled training data that relates content to user demographics. Using supervised training, ML model 131 is provided with a labeled dataset consisting of user profiles and their historical engagement data. The ML model 131 can learn to associate input features, such as user demographics, past behavior, and other relevant context, with the target outcome, like a conversion. Then a trained ML model 131 can be used to predict the most effective content or type of content given an input set of demographics. Likewise, unsupervised techniques (e.g., clustering, dimensionality reduction, anomaly detection, density estimation, generative models, etc.) can be used to determine patterns in the marketing campaign results as determined by the analytics subsystem 108 and make recommendations and/or predictions based on those patterns.

The techniques of the present disclosure are applicable to a variety of ML models used for predictive content adaptation. For example, the ML model 131 may include one or more of the following types of ML models commonly used for classification and prediction: linear regression, logistic regression, decision tree, random forest, gradient boosting machine (GBM), extreme gradient boosting (XGBoost), support vector machine (SVM), naive bayes, k-nearest neighbor (KNN), principal component analysis (PCA), factorization machines (FM), autoencoder, convolutional neural network (CNN), recurrent neural network (RNN), long short-term memory (LSTM), generative adversarial network (GAN), deep belief network (DBN), multilayer perceptron (MLP), randomized search, Bayesian optimization, or a combination thereof. This list of applicable models is non-limiting and a person of ordinary skill in the art will recognize that the techniques of the present disclosure may be used with other ML models, approaches, and algorithms.

The analytics subsystem 108 is used by the content mapping subsystem 106 to measure the performance of ongoing campaigns. In one example implementation, the content mapping subsystem 106 includes a campaign performance rate measuring module 134 and analytics store 136. The analytics subsystem receives telemetry and information relating to interactions with the communications sent from the client devices 110 of the target recipients while interacting with marketing communications. The telemetry and information may include, among other things, mouse clicks, mouse movement, mouse scrolling, touch events, keyboard input, page views, page load time, session duration, bounce rate, exit rate, form submissions, social media interactions, email opens, email clicks, video plays, video completion rate, heat maps, scroll maps, user flow, user demographics, or user location. The telemetry and information may be measured with respect to individual content items or to the communication(s) as a whole.

The campaign performance rate measuring module 134 includes components for detecting, measuring, quantifying, and comparing interactions with marketing communications. For example, campaign performance rate measuring module 134 may use the information about interactions with the communications to calculate standard marketing measurements such as viewable impressions, click-through rate, conversion rate, bounce rate, exit rate, engagement rate, time on site, form completion rate, page views per session, scroll depth, heat map analysis, click map analysis, user flow analysis, average session duration, session duration by channel, average page load time, page load time by device, exit rate by page, click-through rate by page, conversion rate by page, video engagement rate, video completion rate, social media engagement rate, email open rate, email click rate, user behavior segments, audience demographics. Other measurements are possible, in addition to these examples. One of ordinary skill in the art will recognize that a variety of techniques can be used for measuring interactions with marketing communications or content items.

For example, viewable impressions ("VI") are a common measure used in digital marketing to set and measure threshold criteria for whether a particular piece of content has been viewed. A VI is an example interaction. For example, in one implementation, a VI is counted only when a configurable minimum portion of the ad is visible on a client (e.g., a web browser) for a minimum duration. A VI can be measured, for example, using JavaScript code running in the client.

In some examples, measurements determined by the campaign performance rate measuring module 134 may be converted or combined to produce aggregate conversion metrics. A conversion metric is one that is used to determine the instantaneous or overall success of a marketing campaign. A conversion metric may be derived from one or more calculations or measurements including, for example, weighted combinations of calculated terms. In some examples, calculations or measurements may be normalized so that terms may be arithmetically combined or regularized by adding one or more bias terms to affect the relative influence of certain metrics. For example, a marketer may include VIs of the dynamic content portion as a term in a conversion metric to be used to determine the success rate of the campaign while it is executing. In addition to weighted addition, other approaches for the calculation of aggregate conversion metrics may be used.

Analytics subsystem 108 may include analytics store 136. Analytics store 136 may include a memory device including, for example, an in-memory cache or database, a local or remote database, a cloud storage provider, or a third-party hosted analytics platform. The analytics store may be used for ephemeral storage of measurements, calculations, metrics, and derived metrics gathered and generated during the course of a marketing campaign. The information may be requested by a component of the content mapping subsystem 106 for predictively and dynamically updating content using nested A/B testing. In some embodiments, analytics subsystem 108 can provide an API for providing information to, for example, the content mapping subsystem.

Figure 2:
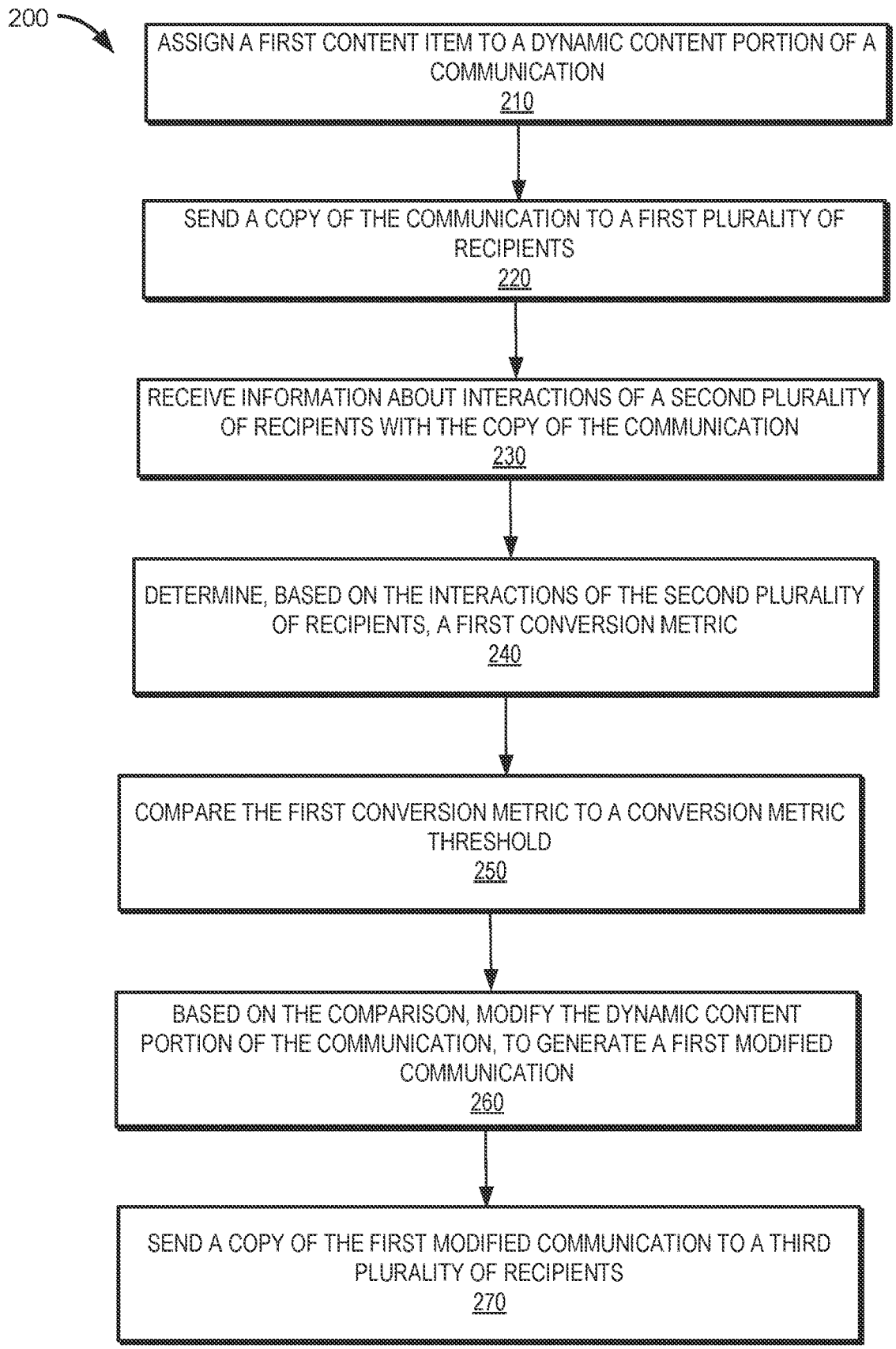
FIG. 2 is a flow diagram of an example of a process for predictively and dynamically updating content nested using A/B testing, according with some aspects of the present disclosure.

FIG. 2 is a flow diagram of an example of a process 200 for predictively and dynamically updating content using nested A/B testing. The process 200 depicted in FIG. 2 may be implemented in software executed by one or more processing units of a computing system, implemented in hardware, or implemented as a combination of software and hardware. This process 200 is intended to be illustrative and non-limiting. The example process herein is described with reference to the example dynamic content adaptation system 102 depicted in FIG. 1, but other implementations are possible. Although FIG. 2 depicts various processing operations occurring in a particular order, the particular order depicted is not required. In certain alternative embodiments, the processing may be performed in a different order, some operations may be performed in parallel, or operations may be added, removed, or combined together.

In block 210, the system 102 assigns a first content item to a dynamic content portion of a communication. For example, adaptive content module 130 may receive a content item and associated communication, designated for a particular recipient, and prepared using communication subsystem 104. The communication may be a webpage that may be viewed by the recipient that includes a region for hosting a banner ad that is a dynamic content portion. The association between a target recipient and a webpage may be made, for example, using web-based login and session cookies. Adaptive content module 130 can cause the content item (a banner ad) to be mapped to a dynamic content portion of the communication. For instance, in certain embodiments, the adaptive content module 130 may create a value in the test and content mapping cache 128 corresponding to the content item/recipient pair. In other embodiments, the mapping may include creating a database entry, creating a file stored on a filesystem, generating a URL that will be used to load the banner ad when the webpage is rendered, among other possible mapping mechanisms.

In block 220, the system 102 sends a copy of the communication to a first plurality of recipients. For example, with the dynamic content portion mapped as discussed in 210, the communication sending module 118 component of the communication subsystem 104 can send the communication to a first plurality of recipients. For instance, if the communication is a webpage including a dynamic content portion that is a banner ad, the webpage can be deployed to a webserver. Or, if the communication is an email, the email can be sent to the first plurality of recipients. Likewise, if the communication is a video, then the video may be posted to a video streaming web application. Similar examples may apply for other communications. For example, the communication may be a social media post, a search engine advertisement, an affiliate marketing medium, a podcast, virtual events and webinars, interactive content, a chatbot, and so on. In each case, the sending of copy of the communication will use a process that makes the copy of the communication available to the first plurality including the first content item currently mapped to the dynamic content portion. The copy may include dynamically mapped elements that are unique to the particular recipient and/or user segment. Thus, the word "copy" as used herein refers to the generation of a communication based on another communication that includes content that may be mapped according to the designated recipient or characteristics thereof.

The first plurality of recipients, in the simplest case, is a user segment determined by the user segmentation module 120 that includes all target recipients of the marketing campaign. However, the first plurality of recipients may also be a subset of that group. For example, a marketing campaign may be initiated with an A/B test, and the first plurality may be the A or B group. Similarly, the first plurality may be a subset of the group of all target recipients determined by some other means. In certain embodiments, marketing automation software may be used to generate user segments using available recipient data 124. The marketing automation software may include predictive content capabilities that employ ML models for predicting the most effective content for a given recipient or user segment in order to optimize customer engagement, conversion rates, and revenue growth.

In block 230, the system 102 receives information about interactions of a second plurality of recipients with the copy of the communication, wherein the second plurality of recipients is a subset of the first plurality of recipients. For example, consider a simple marketing campaign with 1,000 target recipients (first plurality). After a period of time, the system 102 may receive, via the analytics subsystem 108, telemetry information including indications that 200 (second plurality) of the target recipients have interacted with the communication. At this point, the other 800 recipients have not interacted with the communication (e.g., they have not received the email or viewed the webpage).

For instance, if the communication is a webpage including a dynamic content portion, the interaction may be scrolling the banner ad into the viewable window of a web browser and/or clicking on the banner ad. Or, if the communication is an email, then opening the email may constitute an interaction. The threshold or definition of what is counted as an interaction may be configured by the system 102 or may be configurable as part of the details of each marketing campaign. For instance, one marketing campaign may include any portion of a static image advertisement being viewed as an interaction, whereas a differently configured campaign may require the entire advertisement to be visible for a minimum period of time.

In block 240, the system 102 determines, based on the interactions of the second plurality of recipients, a first conversion metric, wherein the first conversion metric indicates the portion of the second plurality of recipients that have performed one or more conversion interactions. For example, if 200 recipients from the second plurality have interacted with the communication in some way but only 100 have "converted" then an example conversion metric of 50% may be calculated. A conversion, in this context, refers to an interaction or compound interaction that indicates a successful outcome of the marketing campaign. For example, a particular marketing campaign involving emails may define a success threshold including both of the interactions of opening the email and of clicking on a particular link. This is an example of a compound interaction, in which two affirmative recipient interactions are required, but recipient interactions need not be affirmative. Interactions may be of arbitrary complexity and may involve measurements and telemetry from multiple external systems and servers to determine. As with interactions more generally, conversion interactions may be defined at the system 102 level or may be configurable per-campaign.

An example conversion metric relating to a web-based marketing campaign may include a weighted sum of a normalized viewable impressions factor and a normalized binary click factor. In this example, each time a recipient of a web-based communication views a designated portion of the communication for a specified period of time of more, the viewable impressions counter is incremented. Likewise, when the communication is clicked (e.g., a banner advertisement is clicked with the mouse), the binary click factor is set. The factors can be normalized using a suitable normalization scheme and combined using weights corresponding to the importance of each factor as configured by the digital marketer. The foregoing is just one example of a conversion metric; one of ordinary skill in the art will recognize that other approaches to generation of conversion metrics are also possible.

In block 250, the system 102 compares the first conversion metric to a conversion metric threshold. For example, the marketing campaign may be configured with a goal. For instance, the author of the marketing campaign may define a 20% conversion rate as the goal of the marketing campaign, where conversion rate is defined as email recipients that open the email for any amount of time. The conversion metric calculated in 240 may be compared to the conversion metric threshold. In that example, a conversion metric threshold of 0.35 may be defined as success relative to the normalized, weighted sum based on empirical or historical observations. In some examples, the conversion metric threshold may vary across the campaign and/or during the campaign. For instance, during an A/B test, the conversion metric threshold may be different for each group. Or the conversion metric threshold may vary as the campaign progresses according to a preset schedule or algorithm.

In block 260, based on the comparison, the system 102 modifies the dynamic content portion of the communication to generate a first modified communication. Modification of the dynamic content portion of the communication includes any modification to the copy of the communication itself or to content loaded by the communication. For example, modification of a sent email is not generally possible. However, modification of the content loaded by a URL embedded in an email may be possible. In contrast, modification of a webpage that has not yet been viewed by a particular recipient is possible, as long as the webpage has not yet been sent to the client device of the particular recipient. In that case, the communication can be modified on the webserver before it is sent to the client device of the particular recipient. In some examples, even after a webpage has been sent to and received by a client device, the webpage can be updated using, for example, JavaScript. For instance, some example web applications can dynamically re-render their content in response to server-side triggers without requiring a full page reload. In that case, the dynamic content portions may be themselves dynamically reloaded with an updated reference, URL, etc.

Thus, if the comparison meets or exceeds the designated conversion metric threshold, the dynamic content portion is updated. For example, for an email-based communication including a dynamic content portion with an image, the image loaded by the unique URL (unique to the recipient) is changed. For instance, the mapping stored in test and content mapping cache 128 may be updated by adaptive content module 130. In another example, the version of a video located at a particular URL on the web may be updated by adaptive content module 130 via the API of a video hosting service.

In block 270, the system 102 sends a copy of the first modified communication to a third plurality of recipients, wherein the third plurality of recipients is a subset of the first plurality of recipients not including the second plurality of recipients. The third plurality of recipients may include the subset of the first plurality that has not yet interacted with the communication. For example, the members of the third plurality may not have yet opened an email, navigated to a webpage, watched a movie, and so on, according to the configuration of the marketing campaign. The analytics subsystem 108 may be used to track and store such interactions. The interaction data may be provided to user segmentation module 120 for identification and selection of the third plurality.

In this example, in block 270, a nested A/B test is initiated. The remainder of the first plurality (i.e., the subset of the first plurality that does not include the third plurality) may be group A and the third plurality of recipients may be group B. Blocks 220-270 may be repeated for groups A and B, substituting the copy of modified communication and the third plurality for the first plurality, where appropriate. When 270 is reached again, another nested A/B test may be initiated.

Figure 3:
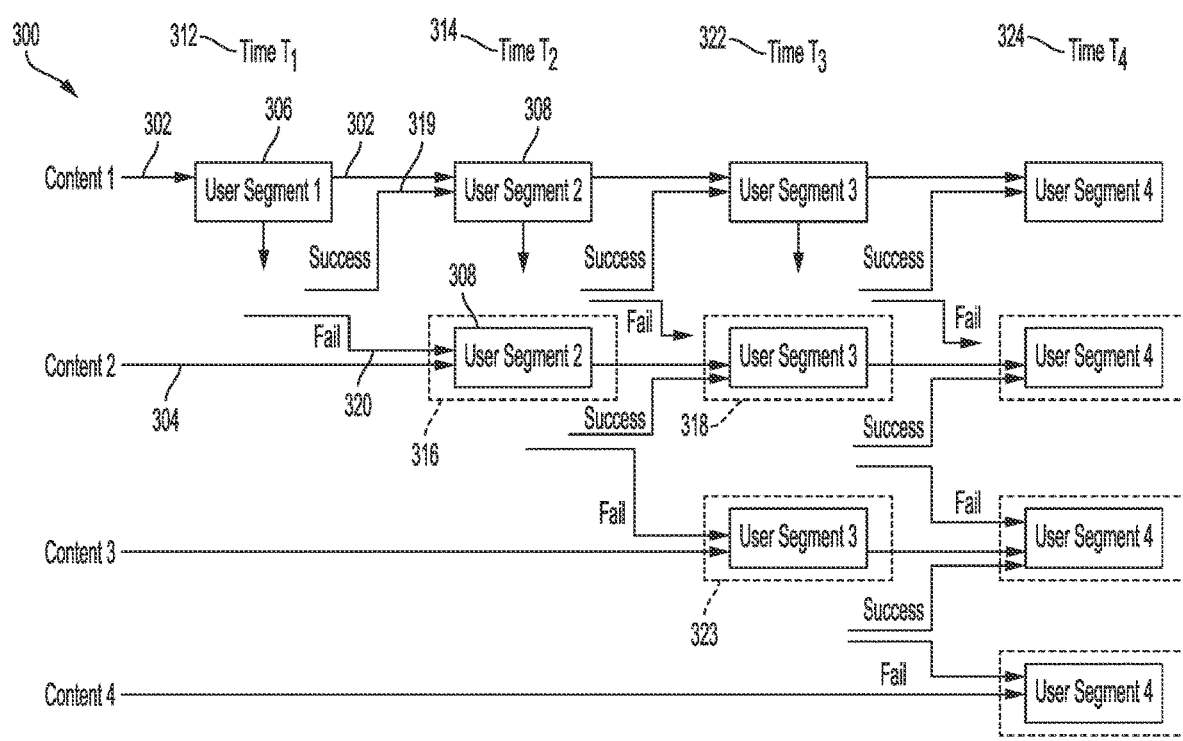
FIG. 3 is a diagram of a timeline illustrating nested A/B testing, according to some embodiments of the present disclosure.

FIG. 3 is a diagram of a timeline 300 illustrating nested A/B testing, according with some aspects of the present disclosure. In timeline 300, a marketing campaign that includes up to three nested A/B tests is shown. However, the techniques of the present disclosure may be used for any number of nested A/B tests. The number of, or depth of, nested A/B tests may be limited by the need for a statistically significant sample size for the determination of whether to perform a nested A/B test. In timeline 300, time is on the horizontal axis, increasing to the right. The time scale is arbitrary, although a typical digital marketing campaign may take place over a period of several hours to several days or more.

Timeline 300 illustrates a marketing campaign in generality, so the type of campaign is not specified. It may correspond to, for example, a web-based campaign, an email marketing campaign, a video advertising campaign, and so on. In each case, the campaign consists of one or more communications of various types. The communications may be emails, videos, web pages, newsletters, forum posts, podcasts, social media posts, e-books, embedded contents, audios, or other suitable media for the conveyance of marketing information, as well as any combination thereof. The marketing campaign begins with a first content item 302 assigned to a first user segment 306 by the content mapping subsystem 106. The first content item 302 may be a part of an email communication. For example, the first content item 302 may be a first video that is assigned to the first user segment 306 using a unique URL that is seen/accessible only by the recipients making up the first user segment 306. The campaign is initiated by a component of the communication subsystem, for example, by the communication sending module 118. In this example, members of the first user segment 306 may receive an email or view a webpage that includes the URL that will cause the first content item 302 to load.

After a period of time $T_1$ 312 has elapsed since the beginning of the campaign, the analytics subsystem 108 counts (or otherwise aggregate) the interactions of the first user segment 306 with the first content item 302. The periodicity of campaign evaluations may be a predetermined value or fixed time interval configured by the marketer. In some examples, the analytics subsystem 108 may determine the times that campaign evaluations occur based on telemetry and interaction data received as the campaign proceeds. The times that campaign evaluation occurs are not necessarily periodic and may occur as statistical certainty is available. For example, by $T_1$ 312, only some portion of user segment 306 will have interacted with the first content item 302. The nested A/B test evaluation process is not performed until the interaction count exceeds an interaction count threshold. The interaction count threshold may be determined empirically or other suitable method to obtain a sufficiently large statistical sample for an accurate evaluation of the success of the campaign at $T_1$ 312. For example, the interaction count threshold may be set at 10% of the recipients making up the first user segment 306.

If the interaction count exceeds an interaction count threshold, then analytics subsystem 108 can perform an evaluation of the campaign performance rate. For example, the campaign performance rate measuring module 134 may determine one or more conversion metrics by aggregating or performing an arithmetic operation on quantified interaction data or data derived therefrom. The analytics subsystem 108 can compare the conversion metric, or campaign performance rate, to a predetermined campaign goal. For example, the predetermined campaign goal may be set at a 20% conversion rate based on historical experiences with similar marketing campaigns. If the campaign performance rate meets or exceeds this rate (success) 319, the marketer may elect to maintain the current content mapping. In certain configurations, this determination may be made automatically, and the marketer may receive a notification, email, or alert. In that event, the second user segment 308 may receive the first content item 302. The second user segment 308 is a subset of the first user segment 306. The second user segment includes members of the first user segment 306 that have not access or otherwise interacted with the first content item 302.

By contrast, if the campaign performance rate fails 320 to meet or exceed the target rate, system 102 may be configured to automatically perform a first nested A/B test 316 to change the trajectory of the campaign to achieve the campaign goal using techniques for predictively and dynamically updating content using nested A/B testing. Nested A/B tests are annotated with a dotted line for illustrative purposes. The first nested A/B test 316 may involve second content item 304 being dynamically assigned/mapped to the second user segment 308, group B. As second user segment 308 is a subset of the members of the first user segment 306 that have not accessed or otherwise interacted with the first content item 302, there is also a remaining subset of the first user segment 306, group A (not shown). Thus, group A (the remainder) may continue to receive the first content item 302, while group B (the second user segment) may receive the second content item 304. The first nested A/B test 316 is "nested" in the sense that it is applicable to only a subset of the initial first user segment 306.

The system 102 may thus dynamically map the second content item 304 to the second user segment 308 (group B), while keeping the first content item 302 mapped to the remainder of the first user segment 306 (group A). The second user segment 308 will receive a modified communication, in which the dynamic content portion, e.g., an inline loaded image, will now load the second content item 304 instead of the first content item 302. The dynamic mapping occurs in real-time, as the marketing campaign proceeds. Moreover, it can occur quickly and efficiently, with no noticeable impact to the target recipients. In some implementations of system 102, the creation of the nested A/B test and the associated dynamic mapping may occur automatically, with no intervention from the marketer directing the campaign. The marketer may receive a notification, email, or alert describing the actions taken by the system 102 as nested A/B tests are executed in accordance with the configured marketing campaign.

At time $T_2$ 314, the process outlined above repeats. However, evaluations for statistical significance can be made for both the first user segment 306 and the second user segment. If sufficient data is available, then at $T_2$ 314, a campaign performance evaluation may be performed for each of the A group and the B group. Based on the outcome of the evaluation, another nested A/B test can be manually or automatically initiated. If the performance of the content received by the remainder of the first user segment 306 (group A) fails to exceed the predetermined campaign goal, then a second nested A/B test 318 involving two subsets of the remainder of the first user segment 306 (group A) may be conducted. Likewise, if the performance of the content received by second user segment 308 (group B) fails to exceed the predetermined campaign goal, then a third nested A/B test 323 involving two subsets of the remainder of the second user segment 308 (group B) may be conducted.

This process may continue until the marketing campaign has concluded or there is insufficient statistical significance to continue given the amount of interaction data available in each subset participating in a nested A/B test. In that case, the campaign may be allowed to continue until its conclusion. FIG. 3 depicts two more times that the campaigns is evaluated, time $T_3$ 322 and time $T_4$ 324. Nested A/B tests may be manually or automatically initiated for each subset of a user segment created during a previous nested A/B test. Thus, the number of nested A/B tests can grow geometrically as the campaign progresses. In some examples, the number of nested A/B tests may be limited to conserve computational resources. This can also be accomplished by limiting the campaign length and periodicity of campaign evaluations.

In this example, the marketing campaign was initiated with a first content item 302 included in a communication to a single first user segment 306. However, in some examples, marketing campaigns may be initiated with an A/B test (or other approach, e.g., A/B/n test). In that case, the outcome of the initial A/B test may result in zero, one, or two nested A/B tests.

Figure 4:
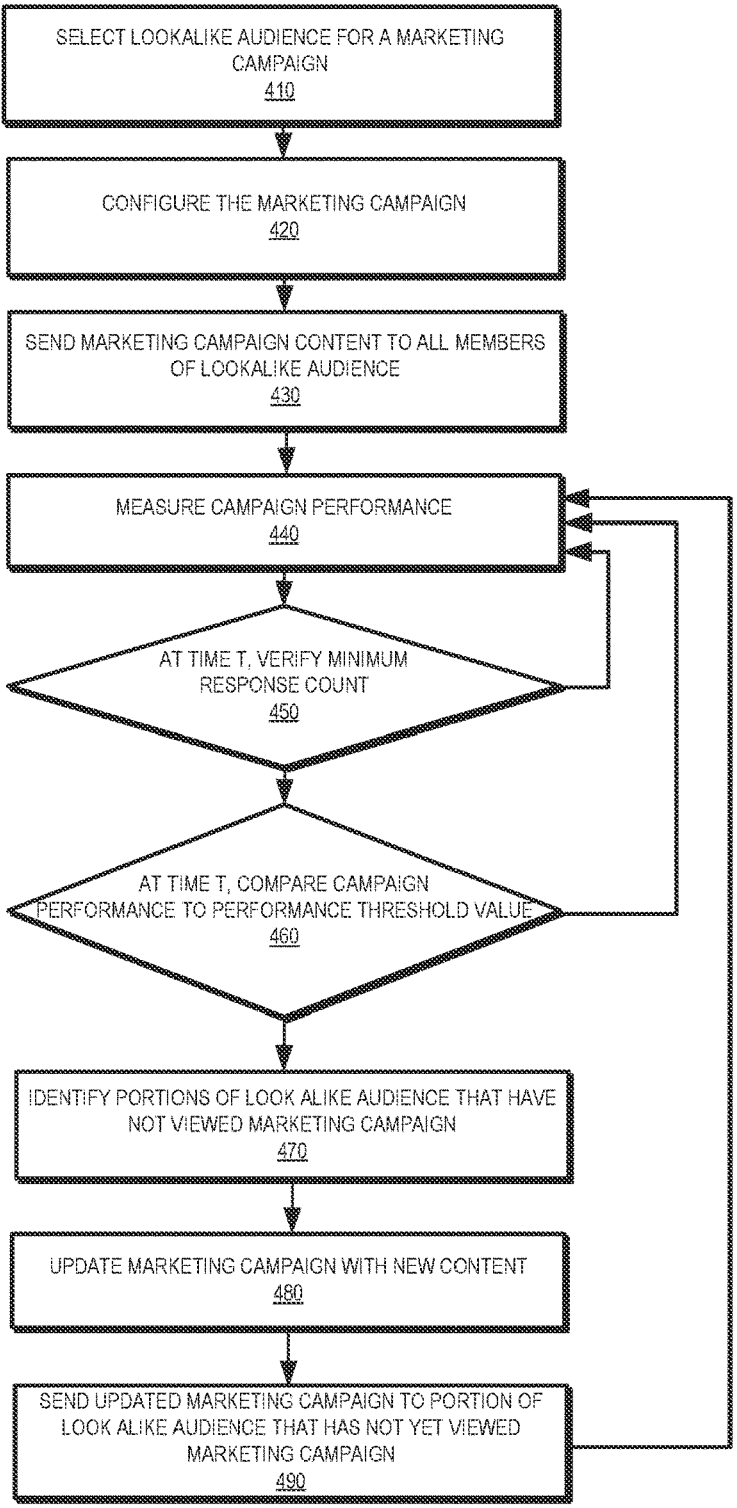
FIG. 4 is a flow diagram of an example of a process for predictively and dynamically updating content using nested A/B testing, according to some embodiments of the present disclosure.

FIG. 4 is a flow diagram of an example of a process 400 for predictively and dynamically updating content using nested A/B testing. The process 400 depicted in FIG. 4 may be implemented in software executed by one or more processing units of a computing system, implemented in hardware, or implemented as a combination of software and hardware. This process 400 is intended to be illustrative and non-limiting. The example process herein is described with reference to the example dynamic content adaptation system 102 depicted in FIG. 1, but other implementations are possible. Although FIG. 4 depicts various processing operations occurring in a particular order, the particular order depicted is not required. In certain alternative embodiments, the processing may be performed in a different order, some operations may be performed in parallel, or operations may be added, removed, or combined together.

In block 410, the system 102 selects a lookalike audience for a marketing campaign. A lookalike audience is selected by identifying and targeting potential communication recipients that share similar characteristics to an existing group of customers or audience. In some examples, the lookalike audience selected is further segmented into subsets prior to the execution of the marketing campaign. The subsets may be differentiated according to narrowing demographic characteristics of the lookalike audience. For example, if the lookalike audience includes potential golf club purchasers, the audience may be further divided into subsets based on color preferences or size preferences. For example, demographic characteristics such as purchase history, search history, browsing behavior, time of day, location, device type, previous engagement with the brand or product, social media behavior, demographic information, or interests and hobbies may be used for the identification of the lookalike audience or subsets thereof. In some embodiments, selection of the lookalike audience for a marketing campaign may be performed by the user segmentation module 120 in concert with marketing automation software.

In block 420, the system 102 configures the marketing campaign. For example, the marketing campaign may be configured using the content authoring module 114 for content item creation and the communication creation module 112 for configuration of the marketing campaign, including generation of one or more communications, each of which may include one or more content items. The communications may each contain one or more dynamic content portions.

In addition to the creation of the communications and the associated content items, the digital marketer can configure the marketing campaign with goals or measures of success as a threshold measure for the initiation of nested A/B tests. For example, a goal may be 10% of recipients in a particular user segment clicking the video URL associated with a marketing communication. Goals may be of arbitrary complexity and may include factors from one or more quantifiable recipient interactions with the communication and its associated dynamic content portion(s).

In block 430, the system 102 sends marketing campaign communications to all members of the lookalike audience. For example, for a marketing campaign involving an email communication with a dynamic content portion, the communication subsystem 104 may send the email to all members of the lookalike audience. In some embodiments, the system 102 may send a copy of the communication with a different content item mapped to the dynamic content portion to each of the subsets determined in 410. This corresponds to an A/B test or A/B/n test in the initial phase of the marketing campaign. Content items may be mapped to dynamic content portions by adaptive content module 130 and temporarily stored in test and content mapping cache 128. The communication may be sent with a suitable component of communication sending module 118.

In block 440, the system 102 measures campaign performance. Campaign performance may be continuously monitored by analytics subsystem 108. Monitoring of campaign performance may include receiving information about recipient interactions with the communication sent in 430. Monitoring of campaign performance may occur at varying levels of granularity appropriate to the computational task. For example, in some circumstances, it may be sufficient to determine whether a communication was delivered or viewed. However, computation of some metrics may require detailed information obtained about user behavior, using, for example, JavaScript to capture user interactions in web browser. Information received by the analytics subsystem 108 may be temporarily stored in the analytics store 136.

In block 450, at time T, the system 102 verifies minimum response count. For example, a minimum number of interactions may be needed for statistical confidence. Time T may correspond to a set periodicity (e.g., after a fixed time interval) or may be triggered by receipt of sufficient data for measurement of statistical confidence, or a combination thereof. Requiring sufficient interactions ensures that the variation of the received data is minimized, which can lead to more precise predictions of the character of the received interactions. A minimum number of interactions may be chosen to achieve the desired level of precision and statistical power. However, the system 102 may also be configured to avoid over-sampling which can lead to needlessly prolonging the marketing campaign or a phase thereof. In a preferred embodiment, a minimum of data from 30 unique recipients may be sufficient to ensure the desired statistical confidence. If the minimum number of interactions for statistical inference has not been achieved, the campaign is allowed to continue at 440, while monitoring performance continuously.

In block 460, at time T, the system 102 compares campaign performance to performance threshold value. Using the campaign performance measured in 440, a performance metric may be calculated. This performance metric, or conversion metric, may be compared with the goal determined by the marketer in 410. If the campaign performance meets or exceeds the goal determined in 410, then the campaign may be continued in its existing configuration at 440, while continuing to monitor campaign performance. However, if the marketing campaign is failing to meet the goal with respect to one or more determined goals for the overall campaign or a portion thereof, then a nested A/B test may be initiated.

In block 470, the system 102 identifies portions of lookalike audience that have not viewed or otherwise interacted with the communications making up the marketing campaign. In a nested A/B test, the test controller 132 generates a data structure for a new test. The data structure may be populated with information about the subset of the lookalike audience that have not viewed or otherwise interacted with the marketing campaign generated by the user segmentation module 120. The data structure may also be populated with information about alternative content items to be mapped to the dynamic content portions of the communications associated with the marketing campaign.

In block 480, the system 102 updates the communications making up the marketing campaign with new content items. For example, the test controller 132 may direct adaptive content module 130 to update mappings associated with dynamic content portions in communications distributed as part of the marketing campaign. Mappings may be temporarily stored in test and content mapping cache 128.

In block 490, the system 102 sends updated communications to the portion of lookalike audience that has not yet viewed the communications of the marketing campaign. The portion of lookalike audience that has not yet viewed the communications of the marketing campaign may be the B group of the nested A/B test while the remaining portion of the lookalike audience, which has viewed the campaign, is the A group. Note that these labels are arbitrary and for illustrative purposes only; the label A or B is interchangeable. For example, communication sending module 118 may update web-hosted content where appropriate with newly-mapped dynamic content. In some examples, however, communications that are already sent cannot be updated including, for example, email. In that case, only the content loaded can be changed after the campaign has begun. Once the updated marketing campaign is available to the portion of lookalike audience that has not yet viewed marketing campaign, the system 102 continuously monitors campaign performance. Additional nested A/B tests can be conducted, within the same marketing campaign, according to the configuration of the particular marketing campaign by repeating some or all of blocks 440-490.

Figure 5:
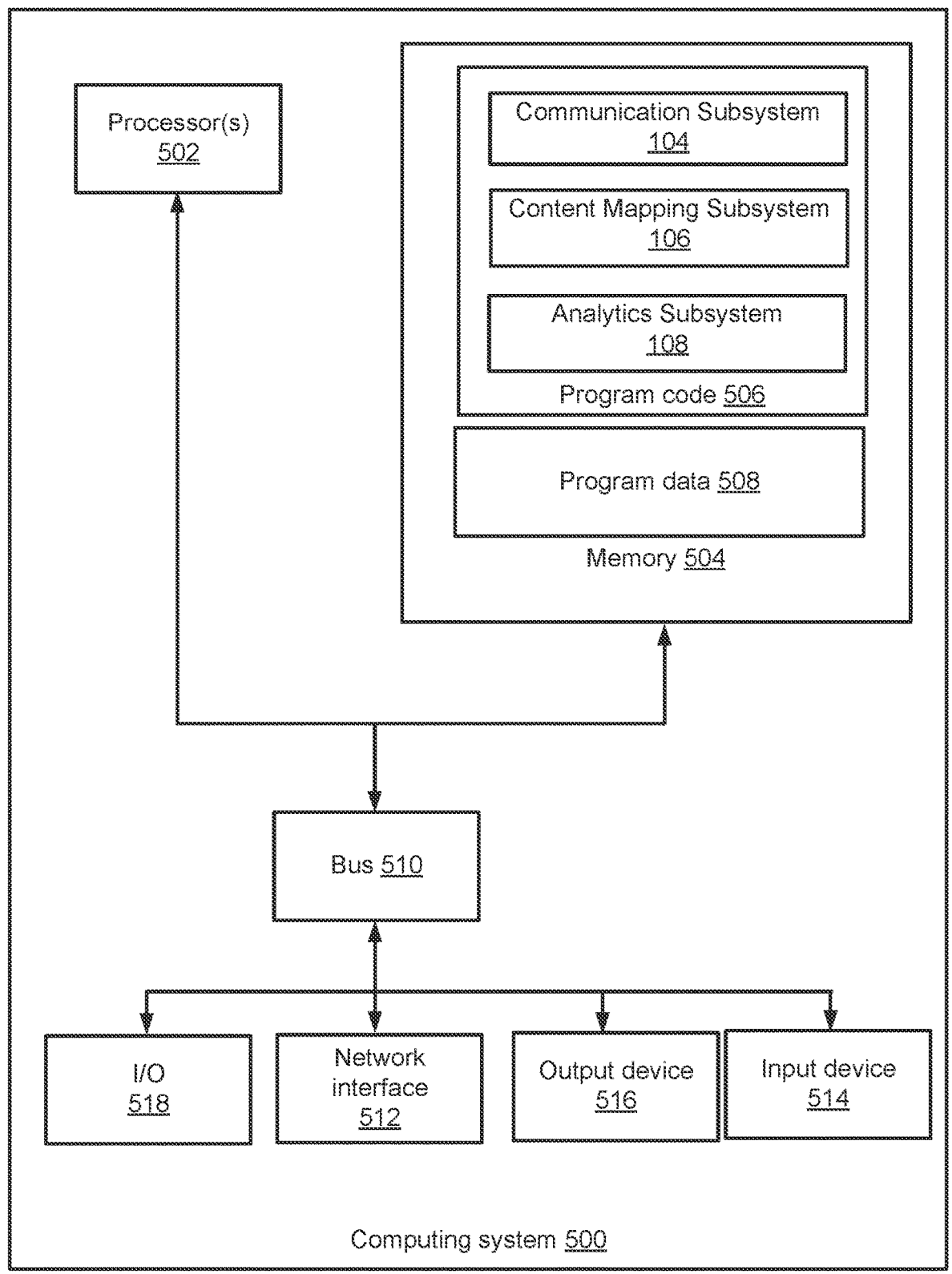
FIG. 5 depicts an example of a computing system that performs certain operations described herein, according to certain embodiments described in the present disclosure.

Any suitable computer system or group of computer systems can be used for performing the operations described herein. For example, FIG. 5 depicts an example of a computer system 500. The depicted example of the computer system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device.

The memory device 504 includes any suitable non-transitory computer-readable medium for storing program code 506, program data 508, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 504 can be volatile memory, non-volatile memory, or a combination thereof.

The computer system 500 executes program code 506 that configures the processor 502 to perform one or more of the operations described herein. Examples of the program code 506 include, in various embodiments, the communication subsystem 104, the content mapping subsystem, and the analytics subsystem 108 of FIG. 1, which may include any other suitable systems or subsystems that perform one or more operations described herein (e.g., one or more ML models, storage systems, controllers, or function-specific modules). The program code 506 may be resident in the memory device 504 or any suitable computer-readable medium and may be executed by the processor 502 or any other suitable processor.

The processor 502 is an integrated circuit device that can execute the program code 506. The program code 506 can be for executing an operating system, an application system or subsystem, or both. When executed by the processor 502, the instructions cause the processor 502 to perform operations of the program code 506. When being executed by the processor 502, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 504 store the program data 508 that includes one or more datasets described herein. In some embodiments, one or more of data sets are stored in the same memory device (e.g., one of the memory devices 504). In additional or alternative embodiments, one or more of the programs, data sets, models, and functions described herein are stored in different memory devices 504 accessible via a data network. One or more buses 510 are also included in the computer system 500. The buses 510 communicatively couple one or more components of a respective one of the computer system 500.

In some embodiments, the computer system 500 also includes a network interface device 512. The network interface device 512 includes any device or group of devices suitable for establishing a wired or wireless data connection to one or more data networks. Non-limiting examples of the network interface device 512 include an Ethernet network adapter, a modem, and/or the like. The computer system 500 is able to communicate with one or more other computing devices via a data network using the network interface device 512.

The computer system 500 may also include a number of external or internal devices, an input device 514, a presentation device 516, or other input or output devices. For example, the computer system 500 is shown with one or more input/output ("I/O") interfaces 518. An I/O interface 518 can receive input from input devices or provide output to output devices. An input device 514 can include any device or group of devices suitable for receiving visual, auditory, or other suitable input that controls or affects the operations of the processor 502. Non-limiting examples of the input device 514 include a touchscreen, a mouse, a keyboard, a microphone, a separate mobile computing device, etc. A presentation device 516 can include any device or group of devices suitable for providing visual, auditory, or other suitable sensory output. Non-limiting examples of the presentation device 516 include a touchscreen, a monitor, a speaker, a separate mobile computing device, etc.

Although FIG. 5 depicts the input device 514 and the presentation device 516 as being local to the computer system 500, other implementations are possible. For instance, in some embodiments, one or more of the input device 514 and the presentation device 516 can include a remote client-computing device that communicates with computing system 500 via the network interface device 512 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 6:
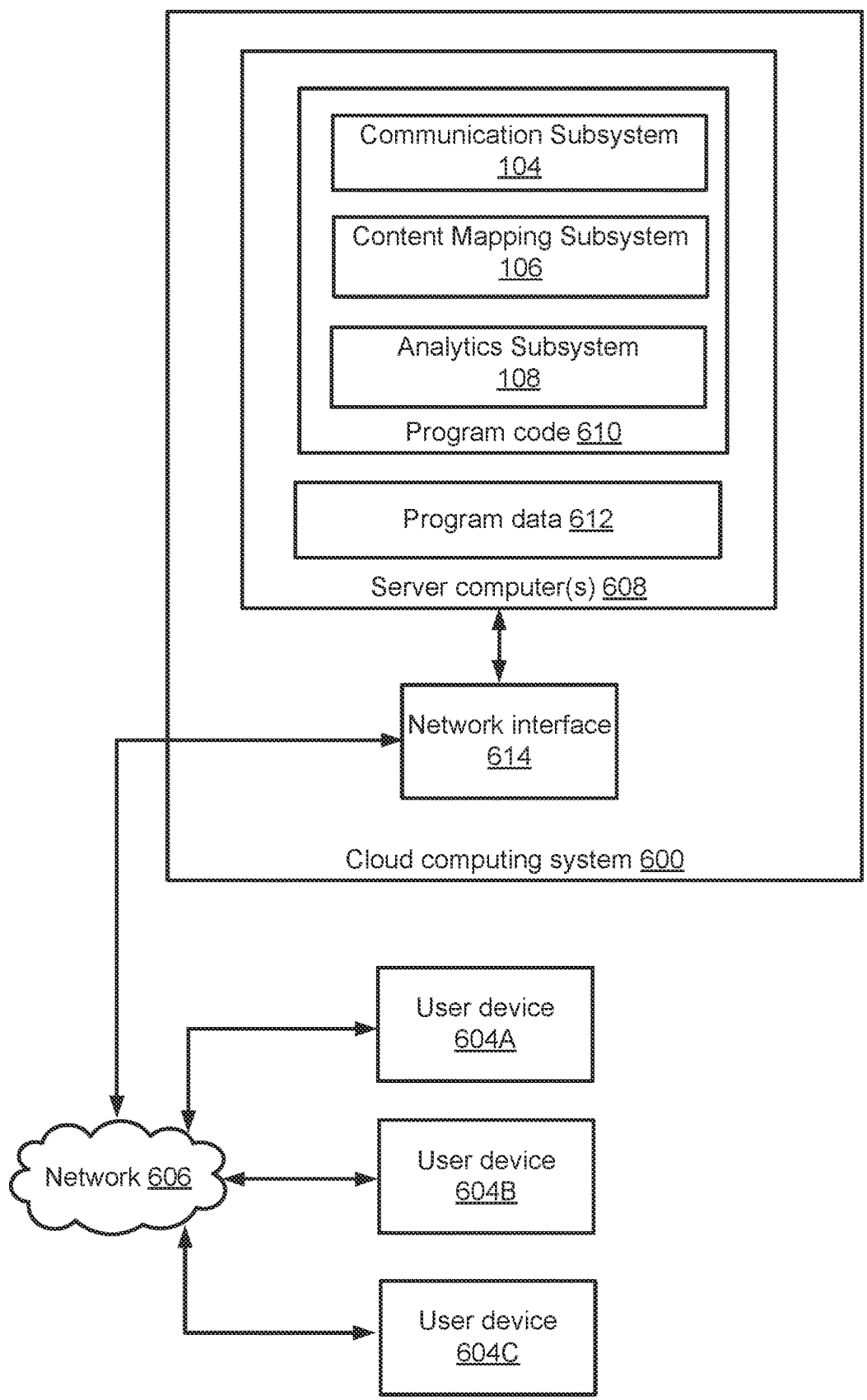
FIG. 6 an example of a cloud computing system that performs certain operations described herein, according to certain embodiments described in the present disclosure.

In some embodiments, the functionality provided by computer system 500 may be offered as cloud services by a cloud service provider. For example, FIG. 6 depicts an example of a cloud computer system 600 offering a service for predictively and dynamically updating content using nested A/B testing. The service can be used by a number of user subscribers using user devices 604A, 604B, and 604C across a data network 606. In the example, the service for predictively and dynamically updating content using nested A/B testing may be offered under a Software as a Service (SaaS) model. One or more users may subscribe to the service for service for predictively and dynamically updating content using nested A/B testing, and the cloud computer system 600 performs the processing to provide the service for predictively and dynamically updating content using nested A/B testing. The cloud computer system 600 may include one or more remote server computers 608.

The remote server computers 608 include any suitable non-transitory computer-readable medium for storing program code 610 (e.g., the communication subsystem 104, the content mapping subsystem, or the analytics subsystem 108 of FIG. 1) and program data 612, or both, which is used by the cloud computer system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 608 can include volatile memory, non-volatile memory, or a combination thereof.

One or more of the server computers 608 execute the program code 610 that configures one or more processors of the server computers 608 to perform one or more of the operations that provide user segmentation, content mapping, and communication analytics. As depicted in the embodiment in FIG. 6, the one or more servers that are predictively and dynamically updating content using nested A/B testing may implement the communication subsystem 104, the content mapping subsystem, and the analytics subsystem 108. Any other suitable systems or subsystems that perform one or more operations described herein (e.g., one or more development systems for configuring an interactive user interface) can also be implemented by the cloud computer system 600.

In certain embodiments, the cloud computer system 600 may implement the services by executing program code and/or using program data 612, which may be resident in a memory device of the server computers 608 or any suitable computer-readable medium and may be executed by the processors of the server computers 608 or any other suitable processor.

In some embodiments, the program data 612 includes one or more datasets and models described herein. Examples of these datasets include training data for ML model 131, recipient data in recipient database 122, and data in analytics store 136. In some embodiments, one or more of data sets, models, and functions are stored in the same memory device. In additional or alternative embodiments, one or more of the programs, data sets, models, and functions described herein are stored in different memory devices accessible via the data network 606.

The cloud computer system 600 also includes a network interface device 614 that enable communications to and from cloud computer system 600. In certain embodiments, the network interface device 614 includes any device or group of devices suitable for establishing a wired or wireless data connection to the data networks 606. Non-limiting examples of the network interface device 614 include an Ethernet network adapter, a modem, and/or the like. For example, communication subsystem 104 can communicate with the user devices 604A, 604B, and 604C via the data network 606 using the network interface device 614.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method, comprising:
   assigning a first content item to a dynamic content portion of a communication, wherein a first network location of the first content item is mapped to the dynamic content portion to cause the first content item to be loaded from the first network location;
   sending a copy of the communication to a first plurality of recipients;
   receiving information about interactions of a second plurality of recipients with the copy of the communication, wherein the second plurality of recipients is a subset of the first plurality of recipients;
   determining, based on the interactions of the second plurality of recipients, a first conversion metric, wherein:
      the first conversion metric is not determined until an interaction count of the second plurality of recipients exceeds an interaction count threshold based on a predetermined level of statistical confidence; and
      the first conversion metric indicates a portion of the second plurality of recipients that have performed one or more conversion interactions;
   comparing the first conversion metric to a conversion metric threshold;
   based on the comparing the first conversion metric to the conversion metric threshold, assigning a second content item to the dynamic content portion of the communication, to generate a first modified communication, wherein a second network location of the second content item is mapped to the dynamic content portion to cause the second content item to be loaded from the second network location when the first modified communication is rendered; and
   sending a copy of the first modified communication to a third plurality of recipients, wherein the third plurality of recipients is a subset of the first plurality of recipients not including the second plurality of recipients.

2. The method of claim 1, wherein:
   the communication comprises a plurality of dynamic content portions, wherein each of the dynamic content portions includes at least one content item; and
   generating the first modified communication comprises modifying at least one of the plurality of dynamic content portions of the communication.

3. The method of claim 1, wherein modifying the dynamic content portion of the communication includes at least one of:
   updating a first mapping to the first content item with a second mapping to the second content item;
   updating an assignment of the first content item to the dynamic content portion with an assignment of the second content item to the dynamic content portion of the communication;
   modifying the first content item; or
   removing the first content item.

4. The method of claim 1, wherein each recipient of the third plurality of recipients has not yet interacted with the copy of the communication.

5. The method of claim 4, further comprising:
   receiving information about interactions of a fourth plurality of recipients with the copy of the first modified communication;
   determining, based on the interactions of the fourth plurality of recipients, a second conversion metric, wherein the second conversion metric indicates a portion of the fourth plurality of recipients that have performed one or more conversion interactions;
   comparing the second conversion metric to the conversion metric threshold;
   based on the comparing the second conversion metric to the conversion metric threshold, modifying the dynamic content portion of the first modified communication, to generate a second modified communication; and
   sending a copy of the second modified communication to a fifth plurality of recipients, wherein the fifth plurality of recipients is a subset of the third plurality of recipients not including the fourth plurality of recipients.

6. The method of claim 1, wherein the first conversion metric is compared to the conversion metric threshold after a fixed time interval.

7. The method of claim 1, wherein the first plurality of recipients is determined based on one or more details about each of the recipients of the first plurality of recipients.

8. The method of claim 1, wherein the third plurality of recipients is determined based on one or more details about each of the recipients of the second plurality of recipients and the interactions of the second plurality of recipients with the copy of the communication.

9. A system, comprising:
a processing device; and
a memory device that includes instructions executable by the processing device for causing the processing device to perform operations comprising:
assigning a first content item to a dynamic content portion of a communication, wherein a first network location of the first content item is mapped to the dynamic content portion to cause the first content item to be loaded from the first network location;
sending a copy of the communication to a first plurality of recipients;
receiving information about interactions of a second plurality of recipients with the copy of the communication, wherein the second plurality of recipients is a subset of the first plurality of recipients;
determining, based on the interactions of the second plurality of recipients, a first conversion metric, wherein:
the first conversion metric is not determined until an interaction count of the second plurality of recipients exceeds an interaction count threshold based on a predetermined level of statistical confidence; and
the first conversion metric indicates a portion of the second plurality of recipients that have performed one or more conversion interactions;
comparing the first conversion metric to a conversion metric threshold;
based on the comparing the first conversion metric to the conversion metric threshold, assigning a second content item to the dynamic content portion of the communication, to generate a first modified communication, wherein a second network location of the second content item is mapped to the dynamic content portion to cause the second content item to be loaded from the second network location when the first modified communication is rendered; and
sending a copy of the first modified communication to a third plurality of recipients, wherein:
the third plurality of recipients is a subset of the first plurality of recipients not including the second plurality of recipients; and
each recipient of the third plurality of recipients has not yet interacted with the copy of the communication.

10. The system of claim 9, wherein modifying the dynamic content portion of the communication includes at least one of:
updating a first mapping to the first content item with a second mapping to the second content item;
updating an assignment of the first content item to the dynamic content portion with an assignment of the second content item to the dynamic content portion of the communication;
modifying the first content item; or
removing the first content item.

11. The system of claim 10, wherein the second content item is determined by a machine learning model based on one or more details about each of the recipients of the third plurality of recipients.

12. The system of claim 9, further comprising:
receiving information about interactions of a fourth plurality of recipients with the copy of the first modified communication;
determining, based on the interactions of the fourth plurality of recipients, a second conversion metric, wherein the second conversion metric indicates a portion of the fourth plurality of recipients that have performed one or more conversion interactions;
comparing the second conversion metric to the conversion metric threshold;
based on the comparing the second conversion metric to the conversion metric threshold, modifying the dynamic content portion of the first modified communication, to generate a second modified communication; and
sending a copy of the second modified communication to a fifth plurality of recipients, wherein the fifth plurality of recipients is a subset of the third plurality of recipients not including the fourth plurality of recipients.

13. The system of claim 9, wherein the first plurality of recipients is determined based on one or more details about each of the recipients of the first plurality of recipients.

14. The system of claim 9, wherein the third plurality of recipients is determined by a machine learning model based the interactions of the second plurality of recipients with the copy of the communication.

15. A non-transitory computer-readable medium comprising instructions that are executable by a processing device for causing the processing device to perform operations comprising:
assigning a first content item to a dynamic content portion of a communication, wherein a first network location of the first content item is mapped to the dynamic content portion to cause the first content item to be loaded from the first network location;
sending a copy of the communication to a first plurality of recipients;
receiving information about interactions of a second plurality of recipients with the copy of the communication, wherein the second plurality of recipients is a subset of the first plurality of recipients;
determining, based on the interactions of the second plurality of recipients, a first conversion metric, wherein:
the first conversion metric is not determined until an interaction count of the second plurality of recipients exceeds an interaction count threshold based on a predetermined level of statistical confidence; and
the first conversion metric indicates a portion of the second plurality of recipients that have performed one or more conversion interactions;
comparing the first conversion metric to a conversion metric threshold;
based on the comparing the first conversion metric to the conversion metric threshold, assigning a second content item to the dynamic content portion of the communication, to generate a first modified communication, wherein a second network location of the second content item is mapped to the dynamic content portion to cause the second content item to be loaded from the second network location when the first modified communication is rendered; and
sending a copy of the first modified communication to a third plurality of recipients, wherein:
the third plurality of recipients is a subset of the first plurality of recipients not including the second plurality of recipients; and each recipient of the third plurality of recipients has not yet interacted with the copy of the communication.

16. The non-transitory computer-readable medium of claim 15, wherein modifying the dynamic content portion of the communication includes at least one of:
    updating a first mapping to the first content item with a second mapping to the second content item;
    updating an assignment of the first content item to the dynamic content portion with an assignment of the second content item to the dynamic content portion of the communication;
    modifying the first content item; or
    removing the first content item.

17. The non-transitory computer-readable medium of claim 15, wherein:
    the third plurality of recipients is determined, using a machine learning model, based on one or more details about each of the recipients of the second plurality of recipients and the interactions of the second plurality of recipients with the copy of the communication.

18. The non-transitory computer-readable medium of claim 15, further comprising:
    receiving information about interactions of a fourth plurality of recipients with the copy of the first modified communication;
    determining, based on the interactions of the fourth plurality of recipients, a second conversion metric, wherein the second conversion metric indicates a portion of the fourth plurality of recipients that have performed one or more conversion interactions;
    comparing the second conversion metric to the conversion metric threshold;
    based on the comparing the second conversion metric to the conversion metric threshold, modifying the dynamic content portion of the first modified communication, to generate a second modified communication; and
    sending a copy of the second modified communication to a fifth plurality of recipients, wherein the fifth plurality of recipients is a subset of the third plurality of recipients not including the fourth plurality of recipients.

* * * * *